United States Patent
Rosenberg

(10) Patent No.: US 8,966,089 B2
(45) Date of Patent: Feb. 24, 2015

(54) SUPPORTING PROXY DISCOVERY

(75) Inventor: Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1780 days.

(21) Appl. No.: 11/871,449

(22) Filed: Oct. 12, 2007

(65) Prior Publication Data

US 2008/0091831 A1 Apr. 17, 2008

Related U.S. Application Data

(60) Provisional application No. 60/829,193, filed on Oct. 12, 2006.

(51) Int. Cl.
| | |
|---|---|
| G06F 15/16 | (2006.01) |
| H04L 12/28 | (2006.01) |
| H04L 29/08 | (2006.01) |
| H04L 29/14 | (2006.01) |

(52) U.S. Cl.
CPC ............ *H04L 67/28* (2013.01); *H04L 69/40* (2013.01)
USPC ............................ 709/227; 709/217; 370/389

(58) Field of Classification Search
USPC .......................................... 709/227; 370/389
See application file for complete search history.

(56) References Cited

U.S. PATENT DOCUMENTS

| | | | | |
|---|---|---|---|---|
| 7,085,829 | B2* | 8/2006 | Wu et al. ................... | 709/223 |
| 2005/0015492 | A1* | 1/2005 | Kumbalimutt et al. ...... | 709/226 |
| 2006/0036747 | A1* | 2/2006 | Galvin et al. ............... | 709/228 |
| 2008/0056234 | A1* | 3/2008 | Sprague .................... | 370/352 |
| 2008/0123640 | A1* | 5/2008 | Bhatia et al. ............... | 370/389 |

OTHER PUBLICATIONS

J. Rosenberg, et al, "Session Initiation Protocol (SIP): Locating SIP Servers", Columbia U, Jun. 2002, Request for Comments: 3263.*
E. Koivusalo, Discovering Proxies Supporting SIP Outbound draft-koivusalo-sip-outbound-discovery-02.xml, Nokia, Jun. 16, 2006, SIP Internet—Draft Expires: Dec. 18, 2006.*
Johns, K., "*Routing of mid dialog requests using sip-outbound*", SIP, Internet Draft, http://tools.ietf.org/html/draft-johns-sip-outbound-middialog-draft, 16 pages, Jun. 17, 2006.
Johns, K., "*Routing of mid dialog requests using sip-outbound*", SIP, Internet Draft, Intended status: Standards Track, http://tools.ietf.org/html/draft-johns-sip-outbound-middialog-draft-01, 17 pages, Oct. 22, 2006.

(Continued)

*Primary Examiner* — Viet Vu
*Assistant Examiner* — Herman Belcher
(74) *Attorney, Agent, or Firm* — Baker Botts L.L.P.

(57) ABSTRACT

In one embodiment, a method includes receiving an invitation request message at a first outbound proxy. The invitation request message is received from a first home proxy. The invitation request message requests a communication session with a user agent. The first outbound proxy lacks a registered communication flow with the user agent. One or more outbound proxies is determined, each having a registered communication flow with the user agent. An identification of the one or more outbound proxies is sent to the first home proxy.

20 Claims, 3 Drawing Sheets

(56) References Cited

OTHER PUBLICATIONS

Johns, K., "*Routing of mid dialog requests using sip-outbound*", SIP, Internet Draft, Intended status: Standards Track, http://tools.ietf.org/html/draft-johns-sip-outbound-middialog-draft-02, 18 pages, Jan. 31, 2007.

Jonathan D. Rosenberg, "*Supporting a Response to a Mid-Dialog Failure*", U.S. Appl. No. 11/832,392, filed Aug. 1, 2007.

* cited by examiner

SUPPORTING PROXY DISCOVERY

RELATED APPLICATION

This application claims benefit under 35 U.S.C. §119(e) of U.S. Provisional Application Ser. No. 60/829,193, entitled "SUPPORTING HIGH AVAILABILITY AND PROXY DISCOVERY WITH SIP OUTBOUND," filed Oct. 12, 2006, by J. Rosenberg.

TECHNICAL FIELD

The present disclosure relates generally to communication networks.

BACKGROUND

A user agent of a communication network may establish a communication dialog through Session Initiation Protocol (SIP) proxies. In certain cases, a proxy may fail during a dialog, which may disrupt the communication. Known techniques for responding to such failures are not satisfactory in certain situations.

DESCRIPTION OF EXAMPLE EMBODIMENTS

Overview

In one embodiment, a method includes receiving an invitation request message at a first outbound proxy. The invitation request message is received from a first home proxy. The invitation request message requests a communication session with a user agent. The first outbound proxy lacks a registered communication flow with the user agent. One or more outbound proxies is determined, each having a registered communication flow with the user agent. An identification of the one or more outbound proxies is sent to the first home proxy.

Description

Figure 1:
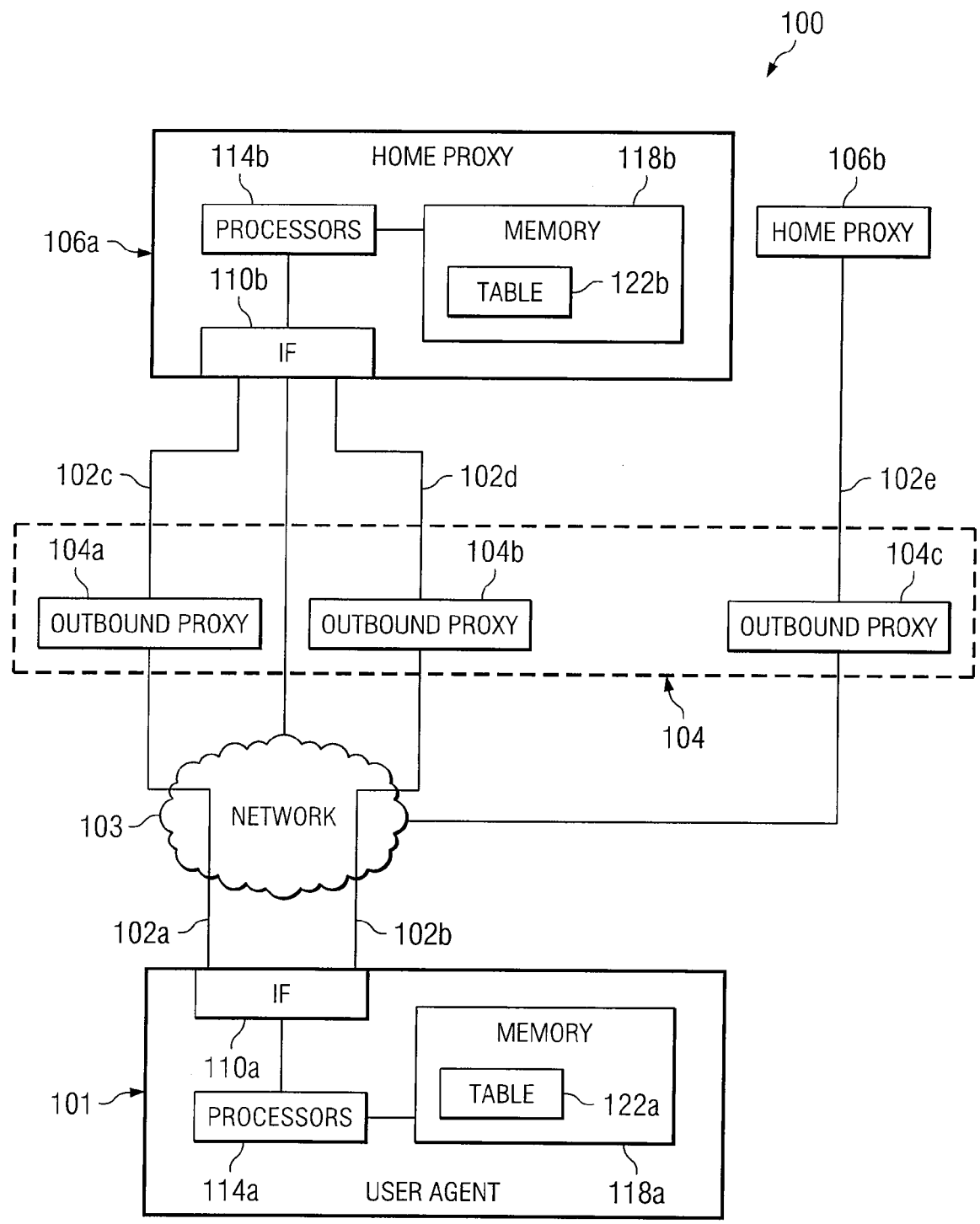
FIG. 1 illustrates an example of a portion of a communication system according to one embodiment.

FIG. 1 illustrates a portion of a communication system 100 according to one embodiment. In the embodiment, system 100 includes a user agent 101, a network 103, one or more outbound proxies 104, and one or more home proxies 106 coupled as shown. Outbound proxies 104*a* and 104*b* have registered flows 102*a* and 102*b*, respectively, through network 103 to user agent 101. In addition, outbound proxies 104*a* and 104*b* have registered flows 102*c* and 102*d*, respectively, to home proxy 106. User agent 101 and home proxies 106 each include respective interfaces (IF) 110, one or more processors 114, and memories 118 that store one or more connection tables 122.

In general, system 100 supports proxy 104 and/or 106 (104/106) discovery. For example, outbound proxies 104*a*, 104*b*, or 104*c* or home proxy 106*a* may inform user agent 101 of an outbound proxy set 104 assigned to user agent 101 for communication to home proxy 106*a*. Outbound proxy set 104 may also inform a home proxy 106*b* of outbound proxy set 104.

System 100 also supports a response to mid-dialog failures. User agent 101 and/or home proxy 106 may maintain connection tables 122. Connection tables 122 record uniform resource identifiers (URIs) that may be used to communicate along flows 102 between user agent 101 and proxies 104/106. In the event of an outbound proxy 104*a* failure, user agent 101 and/or home proxies 106 may use connection tables 122 to identify another outbound proxy 104*b* that may be used. The other outbound proxy 104*b* may be referred to as a backup outbound proxy.

User agent 101 generally refers to any suitable device operable to communicate messages with outbound proxies 104 and/or home proxies 106. User agent 101 may include, for example, a cellular telephone, a mobile handset, a personal digital assistant (PDA), a server, computer such as a desktop or laptop computer, or any other suitable device operable to communicate with outbound proxies 104 and/or home proxies 106 through network 103.

A dialog is a communication between user agents 101. A dialog may include one or more sessions. A session is a communication involving user agent 101 and one or more proxies 104/106 that may include data packets. A user agent 101 has an instance identifier that may remain with user agent 101 for any suitable duration, for example, indefinitely.

Flows 102 (or connections) represent communicative links between user agents 101 and outbound proxies 104 and between outbound proxies 104 and home proxies 106. For example, a flow 102 may be a Transmission Control Protocol (TCP) connection, a User Datagram Protocol (UDP) connection, or any other suitable flow 102. A UDP connection may communicate packets to and from the same Internet Protocol (IP) addresses and ports. A flow 102 has a communication flow identifier identifying the flow. A flow 102 may be used to provide broadband access, and may be reused even in the presence of an intervening network address translation between an outbound proxy 104 and a home proxy 106.

User agent 101 creates a flow 102 towards an outbound proxy 104 during registration. User agent 101 may create multiple communication flows 102 towards different outbound proxies 104. Flow 102 is then held open by user agent 101 and outbound proxy 104. A message for user agent 101 is routed to outbound proxy 104, which routes the message to user agent 101 over the flow 102.

User agent 101 may utilize a keepalive mechanism to maintain the communication flow 102. The keepalive mechanism may be used to detect failures of outbound proxy 104 and to initiate a new flow 102. A keepalive mechanism may include the mechanism as described by the STUN (Simple Traversal of UDP (User Datagram Protocol) through NATs (Network Address Translators) protocol.

Network 103 generally refers to any interconnecting system capable of transmitting packets. Network 103 may comprise, for example, all or a portion of a cellular telephone network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Outbound proxies 104 generally perform perimeter networking functions for system 100. For example, outbound proxies 104 may route messages to and from user agents 101 for one or more sessions. Outbound proxies 104 may be servers, routers, and/or other suitable network element. Although system 100 includes three outbound proxies 104a, 104b, and 104c, any suitable number of outbound proxies 104 may be used. Outbound proxies 104 may or may not be substantially similar to each other. For example, they may be able to perform similar decoding operations on URIs to identify proxies 104 with registered flows.

In one embodiment, user agent 101 is assigned an outbound proxy set 104 that includes outbound proxies 104a, 104b, and 104c that user agent 101 may use to communicate with home proxies 106a and 106b. If an outbound proxy 104a fails, another outbound proxy 104b of outbound proxy set 104 may be used as a backup outbound proxy.

Home proxies 106 generally perform core functions for system 100. For example, home proxies 106 may access user agent 101 profiles from a database (not explicitly shown), process registrations, and/or provide location service functions. In some embodiments, home proxies 106 may be structurally similar to outbound proxies 104 and/or may perform outbound proxy 104 functions. Hence, some such embodiments may not include outbound proxies 104. Although system 100 includes two home proxies 106a and 106b, any suitable number of home proxies 106 may be used.

The example mechanisms disclosed herein may apply to any client, including, for example, user agent 101, outbound proxies 104, and home proxies 106. Various embodiments generally include two sets of mechanisms: one set for associating URIs with flows, and another set for choosing a flow 102 for sending a request; however, any suitable rules or protocol arrangements may be used.

In one embodiment, user agent 101 and home proxy 106a store connection tables 122a and 122b, respectively. A connection table 122 associates a uniform resource identifier (URI) with a flow 102 that can be used to reach the URI. A URI may generally include a user part, a domain part, and a parameter part. The user part may include user information such as a user name. The domain part may include domain information such as a domain name. The parameter part may include parameters such as an opaque parameter that includes the SIP dialog state.

URI-flow associations may be established in any suitable manner. In one embodiment, a URI used to open a flow 102 may be associated with the flow 102. In addition, URIs from SIP service route (for example, Service-Route) or record route (for example, Record-Route) header fields may be associated with flows 102. In general, a service route designates a route that user agent 101 may use to request outbound service, and a record route specifies a proxy through which mid-dialog requests are to be routed. Service routes may be received in response to a registration request, and record routes may be received in response to a dialog setup request.

In the embodiment, if the domain of a URI of a service or record route matches a URI already associated with a flow 102 used to send the registration request, the service or record route URI may be associated with the flow 102. A user agent 101 may look at the domain of the topmost URI of the record route set given by a dialog setup request or response. If the domain matches an already associated URI, user agent 101 associates the record route URI with the flow 102. A proxy 104/106 may look at the domain of the next-hop URI of the record route header field. If the domain matches an already associated URI, the proxy 104/106 associates the record route URI with the flow 102.

In one embodiment, URIs generated from a connection request for a flow 102 may be associated with the flow 102. For example, a proxy 104/106 may receive a connection request for a flow 102, such as a TCP/TLS connection. If the client of flow 102 offers a certificate, a URI generated from the host name in the certificate may be associated with the flow 102.

To send a request to a target URI, user agent 101 and/or proxies 104/106 search the URI-flow associations for a flow 102 associated with the target URI. The sender may perform a most specific match search by comparing the target URI with candidate URIs of the URI-flow associations. In this example, a match is considered most specific if the URIs and opaque URI parameters match, partly specific if only the user and domain parts match, and least specific if only the domain parts match. The request is sent over any flow 102 corresponding to a most specific match, if one exists. If there are no most specific matches, the request is sent over any flow 102 corresponding to a partly specific match. If there are no partly specific matches, the target URI hostname is resolved, and the request is sent to over a flow 102 that is least specific match having the same Internet Protocol (IP) address and port as the resolved hostname. If, in any of the previous steps, more than one URI-flow association equally matches, one of the equally matching URI-flows is chosen randomly. If the most specific match search does not find any matches that are most specific, partially specific, or least specific, then a new flow 102 is initiated.

In one embodiment, a proxy 104/106 can perform load balancing. A proxy 104/106 receives a communication session request having a target identifier. Proxy 104/106 compares the target identifier to flow identifiers of existing flows. If a flow identifier most specifically matches the target identifier, the flow identified by the flow identifier is used, and the request is forwarded to that flow.

If no flow identifier most specifically matches the target identifier, the target identifier is resolved to a target network address. If there is an existing flow to the target network address, then the existing flow is utilized, and the request is forwarded to that flow. Otherwise, a new communications flow is initiated to the target network address, and the request is forwarded to that flow.

In the embodiment, target and flow identifiers may have target and flow parts, respectively. The target parts may include a target domain part, target user part, and target parameter part. The flow parts may include a flow domain part, flow user part, and flow parameter part. A most specific match between target and flow identifiers may be similar to the most specific match between target and candidate URIs described above.

A component of system 100 may include any suitable arrangement of elements, for example, an interface, logic, memory, other suitable element, or a combination of any of the preceding. An interface 110 receives input, sends output, processes the input and/or output, performs other suitable operation, or performs a combination of any of the preceding. An interface 110 may comprise hardware and/or software.

Logic performs the operations of the component, for example, executes instructions to generate output from input. Logic may include hardware, software, other logic, or a combination of any of the preceding. Certain logic, such as a processor 114, may manage the operation of a component. Examples of a processor 114 include one or more computers, one or more microprocessors, one or more applications, other logic, or a combination of any of the preceding.

Memory 118 stores information, including logic. Memory 118 may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 100 without departing from the scope of the invention. The components of system 100 may be integrated or separated. For example, home proxies 106 may include functionality of one or more outbound proxies 104 or vice versa. Moreover, the operations of system 100 may be performed by more, fewer, or other components. For example, the operations of home proxies 106 may be performed by one or three components, or the operations of outbound proxies 104a, 104b, and 104c may be performed by two or more components. Additionally, operations of system 100 may be performed using any suitable logic. As used in this document, "each" refers to each member of a set or each member of a subset of a set. Further details regarding the general operation of system 100 are explained with reference to FIG. 2.

Figure 2:
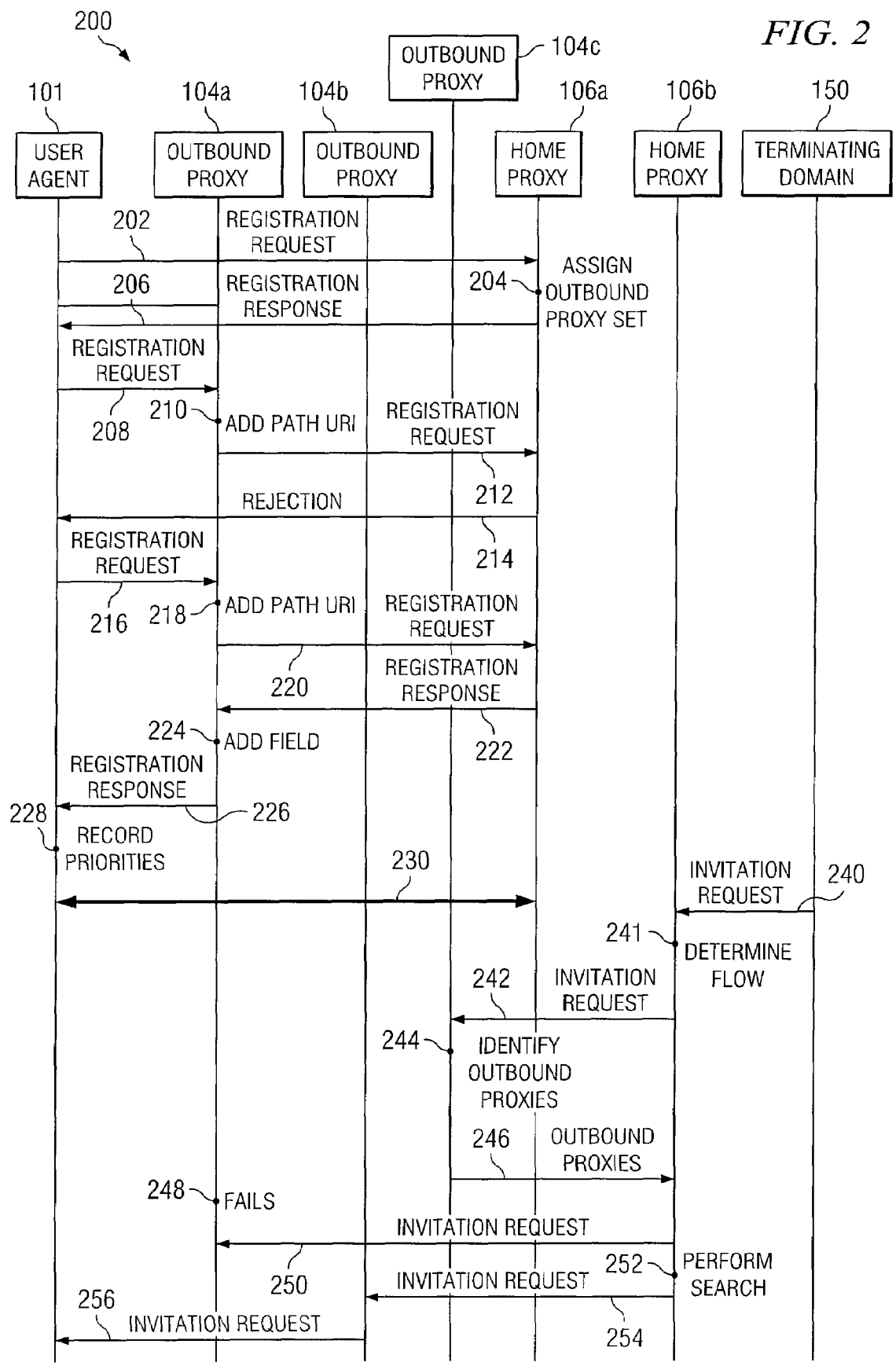
FIG. 2 illustrates an example of a method of informing a home proxy of an outbound proxy set that may be performed by the system of FIG. 1 according to one embodiment.

FIG. 2 illustrates an example of a method of informing home proxy 106b of outbound proxy set 104 that may be performed by system 100 of FIG. 1. Any suitable communication protocol may be used, for example, Session Initiation Protocol (SIP). Any suitable type of connection may be used, for example, Transport Layer Security (TLS) connections.

User agent 101 opens a flow 102 with home proxy 106a, and sends a registration request to home proxy 106a at step 202. The registration request has a request URI:
example.com Home proxy 106a determines that the registration request did not come from an outbound proxy 104, and assigns outbound proxies 104a, 104b, and 104c as an outbound proxy set 104 for user agent 101 at step 204. Home proxy 106a sends a registration response that informs user agent 101 of the outbound proxy set 104 at step 206. The registration response includes an outbound proxy set URI:
outbound.example.com User agent 101 may use the outbound proxy set URI to look up outbound proxies 104a, 104b, and 104c in, for example, a Domain Name Services (DNS) Server.

User agent 101 opens a flow 102a with a selected outbound proxy 104a and sends a registration request to outbound proxy 104a at step 208. The registration request includes the request URI and a route header with the outbound proxy set URI. User agent 101 also associates the outbound proxy set URI with flow 102a, such that the user agent connection table 122a for flow 102a includes:
outbound.example.com Outbound proxy 104a selects a backup outbound proxy 104b, and adds a Path URI that identifies backup outbound proxy 104b to the registration request at step 210. The Path URI may have a user part or opaque part that includes backup outbound proxy 104b, instance, and/or registration identifiers.

Outbound proxy 104a opens a flow 102c with home proxy 106a and sends the registration request to home proxy 106a along flow 102c at step 212. Outbound proxy 104a also associates the request URI with the flow 102c, such that the outbound proxy 104a connection table for flow 102c includes:
example.com Home proxy 106a associates the outbound proxy set URI with the flow 102c, such that the home proxy connection table 122b for flow 102c includes:
outbound.example.com Home proxy 106a sends a rejection to user agent 101 at step 214 in order to challenge for credentials.

User agent 101 sends a new registration request with a username at step 216. User agent 101 is instructed to send the new registration request to the outbound proxy set URI. User agent 101 determines that the outbound proxy set URI is associated with flow 102a, and sends the new registration request along flow 102a.

Outbound proxy 104a adds a Path URI to the new registration request at step 218. The Path URI includes outbound proxy set, user name, instance, and/or registration identifiers, and may also include a keepalive indicator indicating keepalive support:
outbound proxy set identifiers+user name+instance identifier+registration identifier @outbound.example.com; keepalive indicator Outbound proxy 104a determines that the request URI is associated with flow 102c, and sends the new registration request to home proxy 106a along flow 102c at step 220.

Home proxy 106a sends a registration response to outbound proxy 104a at step 222. The service route of the registration response includes the Path URI as the topmost route and the home proxy URI as the second route. The domain of the Path URI matches the domain of the URI associated with flow 102c, so home proxy 106a adds the Path URI to the home proxy connection table 122b for flow 102c to yield:
outbound.example.com
outbound proxy set identifiers+user name+instance identifier+registration identifier @outbound.example.com; keepalive indicator Outbound proxy 104a adds an alternative proxies (for example, Alternative-Proxies) header field to the registration response at step 224. The alternative proxies header field includes the address of backup outbound proxy 104b, and may prioritize outbound proxies 104:
outbound proxy set identifiers+user name+instance identifier+registration identifier @outbound.example.com; backup outbound proxy address Outbound proxy 104a forwards the registration response to user agent 101 at step 226. User agent 101 records the priorities for outbound proxies 104 at step 228. User agent 101 adds the service route URI to the user connection table 122a for flow 102a to yield:
outbound.example.com
outbound proxy set identifiers+user name+instance identifier+registration identifier @outbound.example.com; keepalive indicator At step 230, user agent 101 establishes flows 102b and 102d with outbound proxy 104b and home proxy 106b, respectively, and user agent 101 registers with outbound proxy 104b, using substantially the same steps as those explained previously with reference to steps 216 through 228. Flows 102a and 102b with outbound proxies 104a and 104b, respectively, may have the same Path URI.

The user agent connection table 122a for flow 102b includes:
outbound proxy set identifiers+user name+instance identifier+registration identifier @outbound.example.com; backup outbound proxy address
outbound proxy set identifiers+user name+instance identifier+registration identifier @outbound.example.com; keepalive indicator The home proxy connection table 122b for flow 102d includes:
outbound.example.com
user name+instance identifier+registration identifier @outbound.example.com; keepalive indicator In this example, home proxy 106a has processed the registrations of outbound proxies 104a and 104b, but home proxy 106b has not. In alternative embodiments, however, home proxies 106a and 106b may each process some or all of the respective registrations of outbound proxies 104.

At step 240, a terminating domain 150 sends an invitation request to home proxy 106b for a dialog with user agent 101. The invitation request that the home proxy sends includes a route header field with a topmost URI:

outbound proxy set identifiers+user name+instance identifier+registration identifier @outbound.example.com; keepalive indicator The invitation request from terminating domain 150 also includes a request URI that identifies user agent 101. Terminating domain 150 generally refers to any device operable to dialog with user agent 101 via home proxies 106 and outbound proxies 104. For example, terminating domain 150 may be a remote user agent.

At step 241, home proxy 106b determines that it does not know of any registered communication flows associated with the target URI, so home proxy 106b requests this information from an arbitrarily selected outbound proxy 104. For example, in embodiments using SIP, home proxy 106b may select the outbound proxy 104 according to Network Working Group Request for Comment (RFC) 3263, from the Internet Engineering Task Force (IETF). In this example, home proxy 106b selects outbound proxy 104c and forwards the invitation request to proxy 104c at step 242.

Outbound proxy 104c does not have a registered communication flow 102 with user agent 101, so proxy 104c identifies outbound proxies 104a and 104b with registered communication flows 102 at step 244. Outbound proxy 104c decodes the URI in the route header and determines the set of assigned outbound proxies 104a and 104b.

At step 246, outbound proxy 104c informs home proxy 106b of outbound proxies 104a and 104b with registered communication flows 102. The information may be sent in the form of decoded associations, which may be cached by home proxy 106b.

Outbound proxy 104a fails at step 248. Home proxy 106b attempts to send a message to outbound proxy 104a at step 250, but finds the connection is severed. The information received from outbound proxy 104c indicates that outbound proxy 104b is also a possible outbound proxy, so home proxy 106b attempts to connect to outbound proxy 104b at step 254. Outbound proxy 104b may use a similar procedure to send a message to user agent 101 along flow 102b at step 256. The method then ends.

Figure 3:
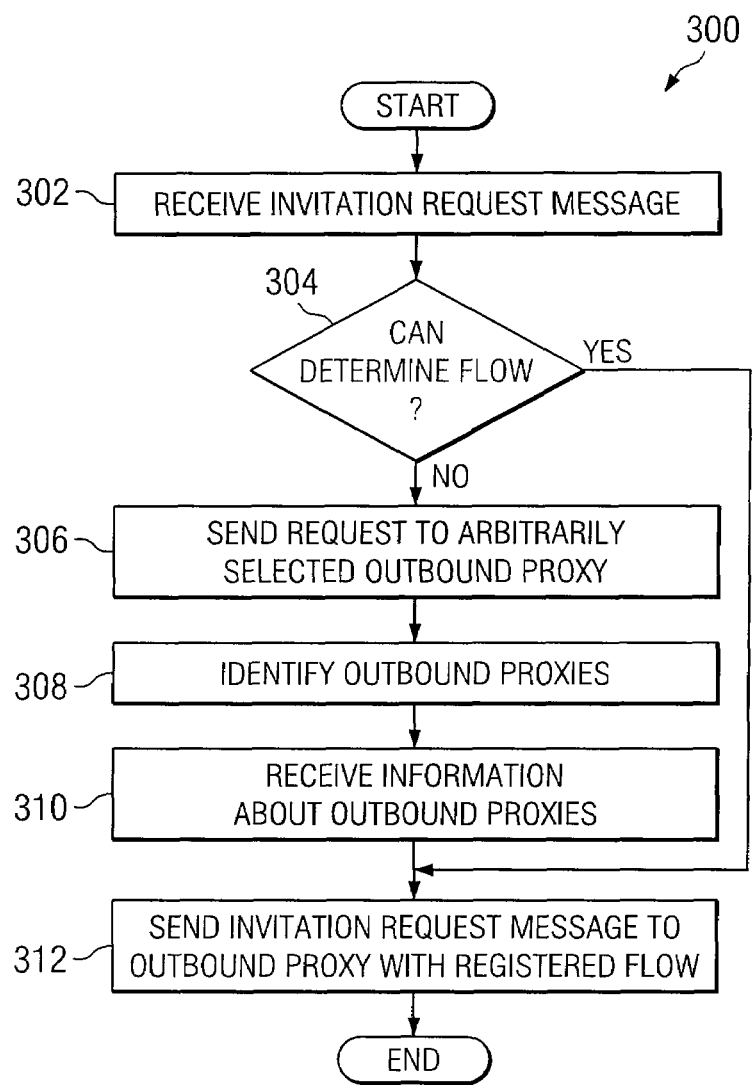
FIG. 3 illustrates an example of a method of a home proxy discovering an outbound proxy set that may be performed by the system of FIG. 1 according to one embodiment.

FIG. 3 illustrates an example of a method that may be performed by the system 100 of FIG. 1 according to one embodiment. In step 302, an invitation request message requesting a session with user agent 101 is received at home proxy 106b. Home proxy 106b may or may not be able to determine the registered communication flows 102 of user agent 101. If home proxy 106b can determine the registered communication flows 102, then home proxy 106b sends the request message to the outbound proxy 104 with the registered communication flow 102 at step 312.

If home proxy 106b cannot determine the registered communication flows, then home proxy 106b sends the request message to an arbitrarily selected outbound proxy 104c at step 306. At step 308, arbitrarily selected outbound proxy 104c identifies outbound proxies 104a and 104b that have flows 102a and 102b with user agent 101, and sends home proxy 106b information about the proxies 104a and 104b.

Home proxy 106b receives the information at step 310, and is now able to determine the outbound proxies 104a. The method then moves to step 312, where home proxy 106b sends the requested message to the outbound proxy 104b.

Modifications, additions, or omissions may be made to the methods described herein without departing from the scope of the invention. The method may include more, fewer, or other steps. Additionally, steps may be performed in any suitable order.

An advantage of certain embodiments of the present disclosure may be that a home proxy can be informed of outbound proxies that have registered. For example, an outbound proxy may inform the home proxy of a set of the outbound proxies with registered communication flows. If an outbound proxy fails, the home agent may use another outbound proxy of the set as a backup outbound proxy.

Another advantage of certain embodiments is that the home and outbound proxies need not be substantially similar. For example, home and outbound proxies may operate according to different protocols (for example, different types of the SIP standard) or may be in different administrative domains, service providers, or networks.

Another advantage of certain embodiments may be that the user agent and/or home proxy may maintain connection tables that support a response to mid-dialog failures. A connection table records uniform resource identifiers (URIs) that may be used to communicate along flows between the user agent and home proxy. The user agent and/or home proxy may use a connection table to identify a backup flow that may be used in case of an outbound proxy failure.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
    receiving an invitation request message at a first outbound proxy, the invitation request message forwarded to the first outbound proxy by a first home proxy, the first home proxy having previously received the invitation request message from a terminating domain, the invitation request message requesting a communication session with a user agent, the first outbound proxy lacking a registered communication flow with the user agent, a registered communication flow being a communication flow that has been registered and is maintained with a keepalive mechanism;
    identifying, from the invitation request message received at the first outbound proxy, which one or more outbound proxies currently have a registered communication flow with the user agent; and
    sending the first home proxy an identification of the one or more outbound proxies identified from the invitation request message received at the first outbound proxy as having a registered communication flow with the user agent.

2. The method of claim 1, further comprising:
    receiving a second request message;
    determining that one of the one or more outbound proxies have failed;

selecting a backup outbound proxy of the one or more outbound proxies using priority information extracted from either the second request message or the invitation request message;
routing the second request message to the backup outbound proxy server.

3. The method of claim 1, wherein the identifying further comprises:
extracting information about the one or more outbound proxies from a header of the invitation request message.

4. The method of claim 1, wherein the invitation request message comprises a Uniform Resource Identifier (URI) identifying the one or more outbound proxies.

5. The method of claim 1, wherein the first outbound proxy is arbitrarily selected by the first home proxy.

6. The method of claim 1, wherein the identifying, further comprises decoding the invitation request message.

7. The method of claim 1, wherein the first home proxy is not operable to decode the invitation request message.

8. An apparatus comprising:
an interface in communication with a first home proxy; and
tangible storage media encoded with logic, the logic operable when executed by one or more computer processors to:
receive an invitation request message at a first outbound proxy, the invitation request message forwarded to the first outbound proxy by the first home proxy, the first home proxy having previously received the invitation request message from a terminating domain, the invitation request message requesting a communication session with a user agent, the first outbound proxy lacking a registered communication flow with the user agent, a registered communication flow being a communication flow that has been registered and is maintained with a keepalive mechanism;
identify, from the invitation request message received at the first outbound proxy, which one or more outbound proxies currently have a registered communication flow with the user agent; and
send the first home proxy an identification of the one or more outbound proxies identified from the invitation request message received at the first outbound proxy as having a registered communication flow with the user agent.

9. The apparatus of claim 8, wherein the logic is further operable when executed by the one or more computer processors to:
receive a second request message;
determine that one of the one or more outbound proxies have failed;
select a backup outbound proxy of the one or more outbound proxies using priority information extracted from either the second request message or the invitation request message; and
route the second request message to the backup outbound proxy server.

10. The apparatus of claim 8, wherein the logic is further operable to determine the one or more outbound proxies by:
extracting information about the one or more outbound proxies from a header of the invitation request message.

11. The apparatus of claim 8, wherein the invitation request message comprises a Uniform Resource Identifier (URI) identifying the one or more outbound proxies.

12. The apparatus of claim 8, wherein the first outbound proxy is arbitrarily selected by the first home proxy.

13. The apparatus of claim 8, wherein the logic is further operable to identify which one or more outbound proxies currently have a registered communication flow with the user agent by decoding the invitation request message.

14. The apparatus of claim 8, wherein the first home proxy is not operable to decode the invitation request message.

15. A method comprising:
receiving a communication session request having a target identifier associated with a target;
comparing the target identifier to each communication flow identifier of a plurality of communication flow identifiers, each communication flow identifier associated with a respective communication flow;
determining if a communication flow identifier most specifically matches the target identifier; and
if no communication flow identifier most specifically matches the target identifier:
resolving the target identifier to a target network address;
if an existing communication flow to the target network address is maintained with a keepalive mechanism, utilizing the existing communication flow; and
if there is no existing communication flow to the target network address that is maintained with a keepalive mechanism, initiating a new communication flow to the target network address that is maintained with a keepalive mechanism.

16. The method of claim 15, further comprising:
if there is the existing communication flow, forwarding the communication session request over the existing communication flow
if there is no existing communication flow, forwarding the communication session request over the new communication flow.

17. The method of claim 15, further comprising:
generating a flow identifier for the new communication flow.

18. The method of claim 15, wherein receiving the communication session request comprises:
receiving the communication request at a home proxy.

19. The method of claim 15, wherein receiving the communication session request comprises:
receiving the communication request at an outbound proxy.

20. A method comprising:
receiving an invitation request message at a first outbound proxy, the invitation request message forwarded to the first outbound proxy by a first home proxy, the first home proxy having previously received the invitation request message from a terminating domain, the invitation request message requesting a communication session between the terminating domain and a user agent, the first outbound proxy lacking a registered communication flow with the user agent, a registered communication flow being a communication flow that has been registered and is maintained with a keepalive mechanism, the first outbound proxy being selected by the first home proxy from among a plurality of outbound proxies;
extracting data from a header of the invitation request message received at the first outbound proxy;
identifying from the data extracted from the header of the invitation request message received at the first outbound proxy:
a primary outbound proxy of the plurality of outbound proxies that currently has a registered communication flow with the user agent, the registered communication flow having a first priority; and a backup outbound proxy of the plurality of outbound proxies that currently has a registered communication flow with the user agent, the registered communication flow having a second priority less than the first priority; and
sending the first home proxy data identifying:
  the primary outbound proxy
  the first priority of the primary outbound proxy;
  the backup outbound proxy; and
  the second priority of the backup outbound proxy.

* * * * *